United States Patent [19]

Jayaram et al.

[11] 4,194,239
[45] Mar. 18, 1980

[54] ELECTRICAL INVERTOR APPARATUS

[76] Inventors: Krishnaswamy Jayaram, Rua Paulo Alves 110, Block A, Apt. 604, Inga, Niteroi, Rio de Janeiro; Michael F. Reusch, Av. Epitacio Pessoa 1274, Ipanema, 20.000 Rio de Janeiro, both of Brazil

[21] Appl. No.: 922,014

[22] Filed: Jul. 5, 1978

[51] Int. Cl.² .................................................. H02M 7/60
[52] U.S. Cl. ...................................... 363/109; 363/122; 363/49
[58] Field of Search .............................. 363/102–103, 363/106–107, 109, 170, 174, 176, 49, 120–124

[56] References Cited

U.S. PATENT DOCUMENTS

| | | | |
|---|---|---|---|
| 1,114,697 | 10/1914 | Hull | 361/133 X |
| 2,241,050 | 5/1941 | Bedford et al. | 363/109 |
| 2,326,677 | 8/1943 | Perelmann | 363/122 |
| 3,089,078 | 5/1963 | Smith et al. | 363/109 |
| 3,302,095 | 1/1967 | Bell et al. | 363/121 |

*Primary Examiner*—J. D. Miller
*Assistant Examiner*—Peter S. Wong
*Attorney, Agent, or Firm*—Beveridge, De Grandi, Kline & Lunsford

[57] ABSTRACT

An electrical invertor circuit comprising a first common electrode and at least two secondary electrodes and means permitting an electric discharge to be established between said first electrode and any one of said second electrodes. A magnetic field is applied through the gaps between said first electrode and said secondary electrodes so as to switch the discharge from one to another of the secondary electrodes. In one arrangement there are two secondary electrodes in the form of two secondary substantially semi-annular electrodes disposed around a circular central electrode so that a rotating spoke discharge is formed. The two semi-annular electrodes are then connected to the terminals of the primary winding of an output transformer whereas a center tap of said winding is connectable to the central electrode through a D.C. power supply. Various embodiments are shown using unidirectional or alternating magnetic fields to switch discharges from one pair of electrodes to another in such a way as to permit the obtention of an alternating output.

25 Claims, 12 Drawing Figures

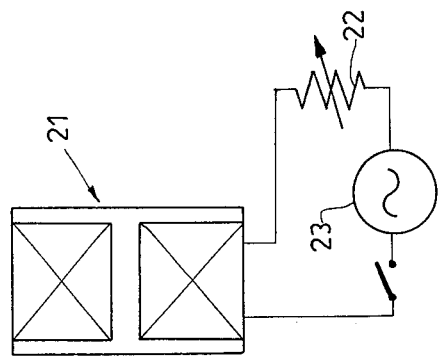
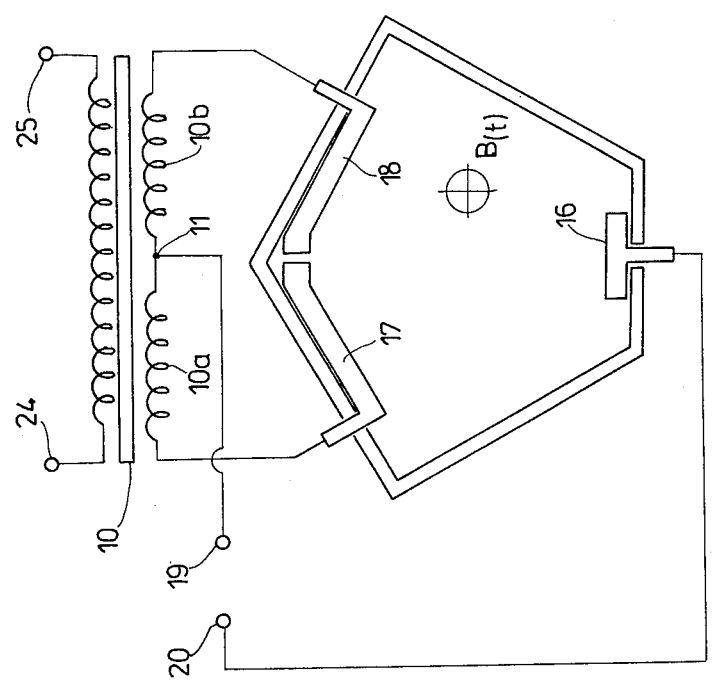
FIG. 4

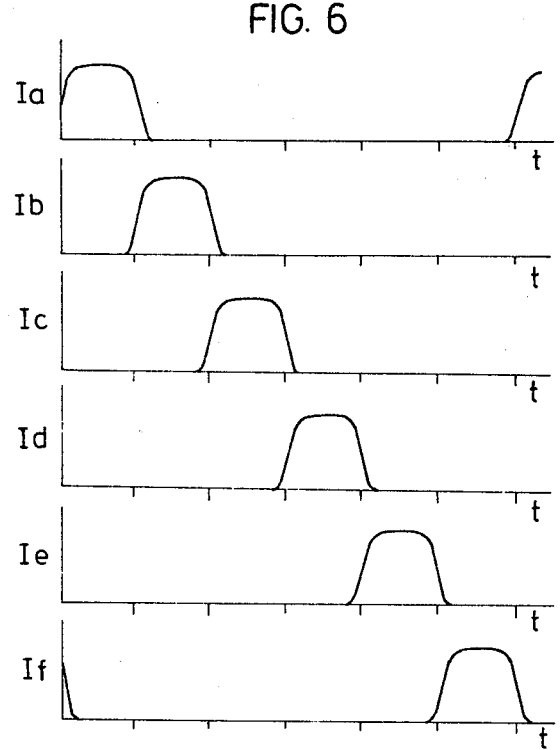
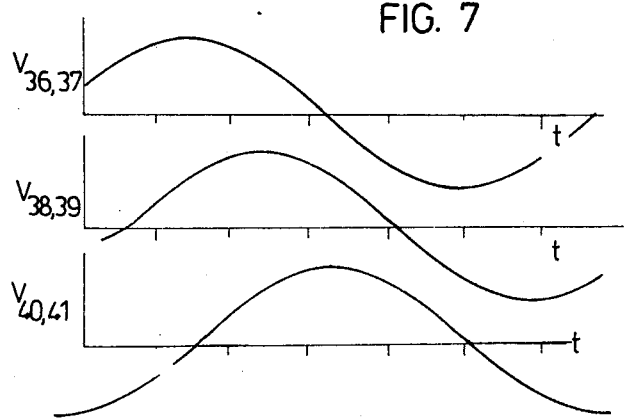

ELECTRICAL INVERTOR APPARATUS

The present invention refers to electrical invertor apparatus.

Many different forms of electrical invertors are known but for intermediate and high power applications they basically fall into the categories of alternators, transistorized (thyristor) invertors and mercury arc invertors. Conventional alternators are considered as virtually obsolete, particularly for high frequency applications or when accurately known frequencies are desired. Transistorized invertors are very susceptible to transients, special switching or firing circuits being necessary, and mercury arc invertors which are normally preferred but involve the use of commutating capacitators, which cause considerable inconvenience and expense, not to mention their bulkiness.

It is the object of the present invention to provide a new electrical invertor apparatus which does not have any moving parts, does not employ commutating capacitators and has a minimum of external circuitry with the highest possible maximum voltage per invertor unit.

According to the present invention an electrical apparatus comprises in combination, a first electrode, at least two second electrodes separated from said first electrode by substantially equal discharge gaps, said second electrodes being spaced from each other by a gap substantially smaller than said discharge gaps, said first electrode having a first terminal for connection to one side of a D.C. power supply, a second terminal for connection to the other side of said D.C. power supply and connected in parallel to each of said at least two second electrodes through respective inductive impedances, magnetic field producing means adapted to establish a magnetic field within said discharge gaps, nonparallel to any electric discharge between said first electrode and any one of said second electrodes so as to shift successively and continuously said discharge from one second electrode to the next, and inductive output means associated with said inductive impedances for producing an output.

In a first preferred arrangement to produce a single phase alternating output, the first electrode is a central generally circular electrode and the second electrodes comprise two substantially 180° annular sector electrodes disposed around and spaced from the central electrode. On initiating an electric discharge between the central electrode and one or other of the outer electrodes and on applying a magnetic field through the gap between the electrode pairs, the discharge rotates around the central electrode and along the surface of its respective outer electrode until it passes to the other outer electrode and continues to rotate. This rotating "spoke" discharge causes current to flow alternately through the above mentioned inductive impedances which comprise, preferably, two halves of a primary winding of an output transformer. The second terminal mentioned for connection to the D.C. supply corresponds to a center tap of said primary winding. The result, obviously, is the induction of an alternating voltage in the secondary winding of the output transformer.

The magnetic field may be produced may a solenoid which may be connected either to the same or to a different D.C. power supply.

In another arrangement there are four to six similar outer electrodes disposed around the central electrode in such a way that the rotating spoke discharge passes successively from one of the outer electrodes to the next. Each outer electrode is connected to the D.C. power supply through a respective primary winding of an output transformer. This permits the obtention of a two- or three-phase alternating output.

In another embodiment of the present invention, a high frequency single-phase invertor comprises a similar arrangement of an even number of outer electrodes annularly disposed around the central electrode, alternate ones of said outer electrodes being connected together so as to form two groups of commonly connected alternate electrodes. The common terminal of one group is connected to one end of a primary winding and the common terminal of the other group is connected to the other end of the same winding. A D.C. power supply may be connected between the central electrode and a center tap of said winding and a unidirectional magnetic field can be established in the annular gap between the central and outer electrodes by use of a solenoid or other adequate means.

In another arrangement the electric discharge from a common electrode can be switched from one to another secondary electrode by means of an alternating magnetic field.

The invention will now be described in greater detail, by way of example, with reference to the accompanying drawings, in which:

FIG. 4 is a circuit diagram showing a second embodiment of the present invention in which an alternating magnetic field is used to switch the discharge from one secondary electrode to another;

FIG. 6 is a graph showing the currents flowing in the primary windings of the invertor of FIG. 5;

FIG. 7 is a graph showing the output voltages produced between the output terminals of the three-phase invertor of FIG. 5;

Figure 1:
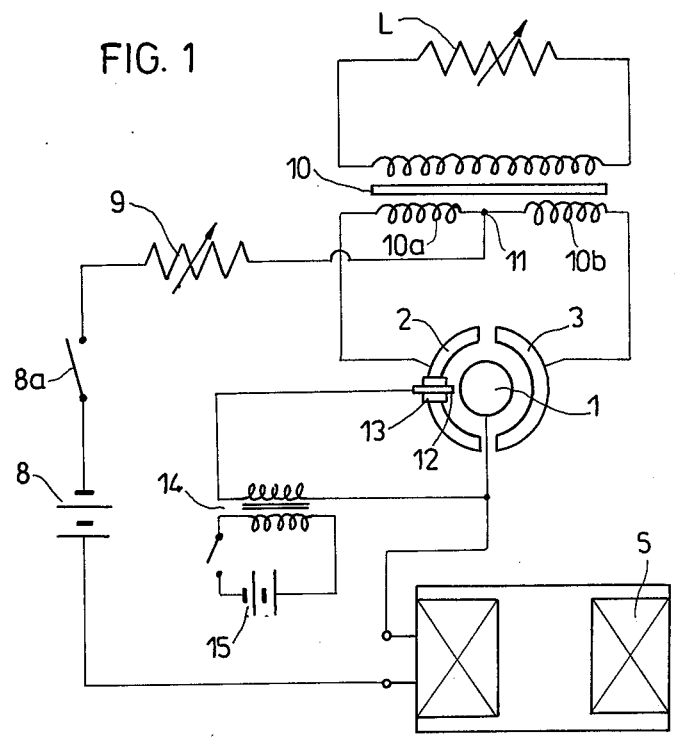
FIG. 1 is a circuit diagram of a prototype invertor circuit, built in accordance with the present invention.
Figure 2:
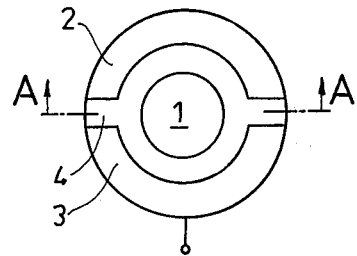
FIG. 2 is a plan view of the invertor electrode arrangement of FIG. 1.
Figure 3:
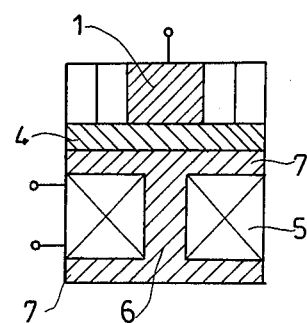
FIG. 3 is a section taken along the line A—A of FIG. 2.

Referring now to the drawings, FIG. 1 is a circuit diagram of an invertor system according to the present invention, whereas FIGS. 2 and 3 are a plan view and a vertical section through the prototype invertor as used therein. The invertor itself as seen in these figures, comprises a solid cylindrical central electrode 1 of mild steel having a diameter of 0.6 cms. and a length of 3 cms. Two substantially semi-circular electrodes 2 and 3 are placed around central electrode 1, these electrodes also being made of mild steel. Each of the outer electrodes 2 and 3 comprises a slightly less than 180° sector of an annulus of 1.5 cms. internal diameter and 2.5 cms. outer diameter so as to define a constant spacing of 0.45 cms. from central electrode 1. Outer electrodes 2 and 3 have a thickness of 3 cms., that is to say, equal to the length of cylindrical central electrode 1. All three electrodes are fixed by any adequate means such as screws (not shown) to an insulating asbestos base 4. The gaps between electrodes 2 and 3 in the circumferential direction are of approximately 0.2 cms.

The above electrode arrangement is placed in association with a short solenoid comprising a coil 5 wrapped on a generally cylindrical mild steel core 6 having end flanges 7. The solenoid arrangement as seen in FIG. 3 has a height of approximately 5 cms. Coil 5 comprises 300 turns of 0.5 mm. diameter insulated wire and has connection terminals.

Referring now to the invertor circuit diagram of FIG. 1, central electrode 1 is connected in series with coil 5, a D.C. power supply 8, a switch 8a and a variable resistor 9. The other side of variable resistor 9 is connected to the center tap 11 of the primary winding of an output transformer 10. The terminals of the two halves 10a and 10b of said primary winding are connected to the outer electrodes 2 and 3.

FIG. 1 also shows a starting circuit arrangement which comprises a needle or starting electrode 12 and an insulator 13 which pass through outer electrode 2, the inner end of needle 12 being directed towards central electrode 1. Electrode 12 is then connected with electrode 1 through the secondary winding of a pulse transformer 14 whose primary can be connected through a D.C. starter supply 15 by momentary closure of a starter switch.

The operation of the prototype invertor and circuit shown in FIGS. 1-3 is as follows:

Firstly, switch 8a is closed and the starter switch is momentarily closed, this latter creating a discharge between needle 12 and central electrode 1. The discharge is then maintained by power supply 8 whereby current passes through coil 5 of the solenoid and the left hand side 10a of the primary winding of output transformer 10. The current which passes in coil 5 produces a magnetic field in the air gap between electrode 1 and electrodes 2 and 3, said magnetic field being substantially parallel to the axis of central electrode 1. The combination of the orthogonal electric and magnetic fields due to the discharge and the current in the solenoid, respectively, results in the discharge rotating in the form of a spoke around inner electrode 1 and along outer electrode 2. As this "spoke" rotates the discharge will pass over the gap between outer electrodes 2 and 3 and will then be maintained between electrodes 1 and 3 rather than electrodes 1 and 2. The continued existence of the magnetic field will ensure continued rotation of the spoke and this will result in current flowing in alternative directions through the two halves 10a and 10b of the primary winding of output transformer 10. This, naturally, results in a single phase current flowing in the secondary circuit of transformer 10 which serves as an alternating current source for any appropriate load such as L (FIG. 1).

In the prototype shown in FIGS. 1-3 output transformer 10 had a 200 turn primary with said central tap 11 and a 100 turn secondary. Direct current supply 6 was rated at 300 volts and 20 amps. Variable resistor 9 was of 10-100 ohms whereas the load L was a variable resistor of 10-30 ohms. During operation power supply 8 delivered 16 amps at 300 volts and the magnetic field at this amperage was 1,000 Gauss. The frequency of rotation of the discharge "spoke" could be varied from 500-1,000 cycles per second by altering the resistance of resistor 9. The voltage across load resistor L was displayed on an oscilloscope which showed an approximately sinusoidal wave form of the same frequency, having a peak to peak voltage of 500 volts.

It will be clear that an invertor such as shown in FIGS. 1-3 may serve as a suitable source for an A.C. motor, the regulation of variable resistor 9 controlling not only the current flowing alternatively through halves 10a and 10b of the primary winding of output transformer 10 but also the magnetic field created by the solenoid. The result is, as seen above, a variation not only of the frequency but also of the voltage in the output circuit. It will also be understood that the solenoid could be connected in a separate circuit from that of the electrodes whereas the starting arrangement could also take any other suitable form, even the momentary placement of conducting material between central electrode 1 and one of the outer electrodes 2 and 3.

Referring now to FIG. 4, the electrical discharge alternating between a common electrode and two further electrodes is obtained by an alternating magnetic field to switch the discharge from one pair of electrodes to the other rather than the rotating spoke discharge-constant magnetic field arrangement of FIGS. 1-3. In FIG. 4 a first electrode 16 is associated with second and third electrodes 17 and 18 which correspond to the outer electrodes of FIGS. 1-3. Electrodes 17 and 18 are connected to the terminals of halves 10a and 10b of the primary winding of an output transformer 10, the center tap 11 of said primary winding being connectable to a D.C. power source by means of a terminal 19. The other side of the power source may be connected to electrode 16 by terminal 20.

FIG. 4 also shows diagrammatically a solenoid 21 to all intents and purposes similar to the solenoid shown in FIGS. 1-3. Solenoid 21, however, is series connected to a variable resistor 22 and an A.C. source 23. It will be appreciated that the solenoid 21 will be placed beneath the electrode arrangement in a manner similar to that shown in FIG. 3 so as to produce an alternating magnetic field $\bar{B}(t)$ normal to the plane of the paper of FIG. 4, in the space between the electrodes 16, 17 and 16, 18.

On connecting source 23 to create the above mentioned alternating magnetic field, by switching on the D.C. power supply between the terminals 19 and 20 and on initiating an electrical discharge, for example, between electrodes 16 and 17 by means of a discharge initiator arrangement which may be similar to needle electrode 12 of FIG. 1, a discharge then passes from electrodes 16 and 17 to electrodes 16 and 18 in an alternating manner, strictly in accordance with the frequency of the magnetic field $\bar{B}(t)$. Just as in the FIG. 1 arrangement the alternate flow in opposite directions of the discharge current through left and right hand halves 10a and 10b of the primary winding of output transformer 10 will result in a single phase output between terminals 24 and 25 of said transformer. Once more any suitable load may be applied between these terminals.

Figure 5:
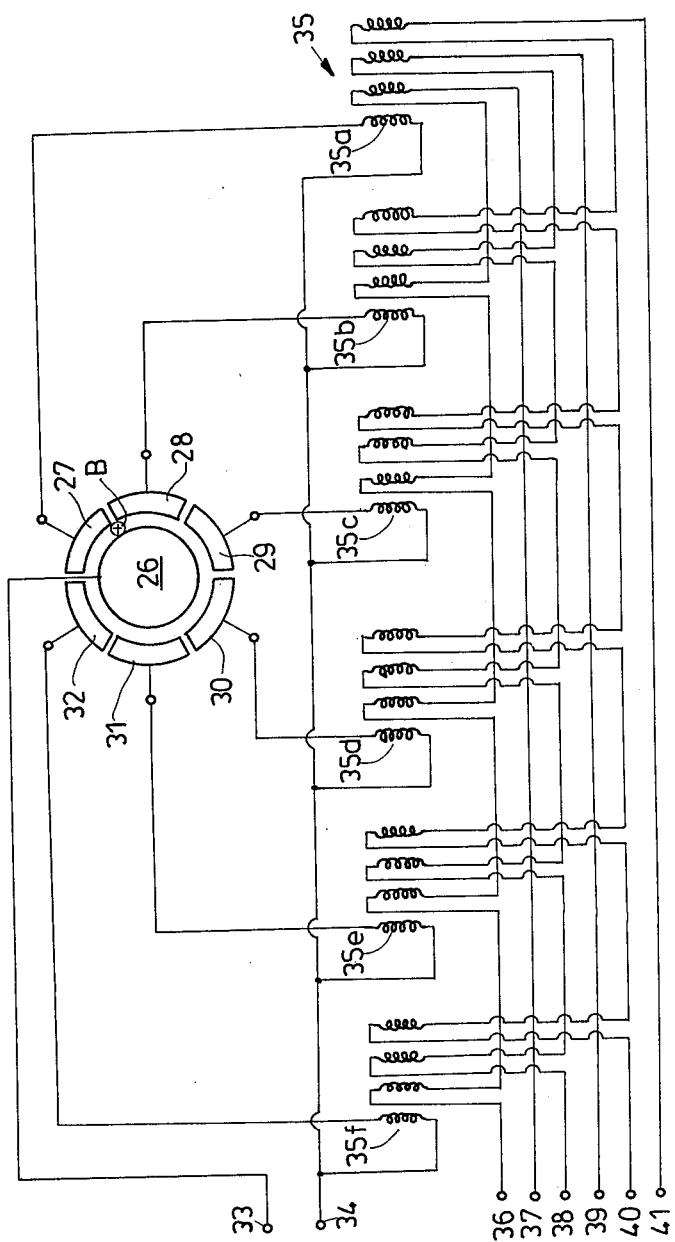
FIG. 5 is a circuit diagram showing a third embodiment of the present invention, built in the form of a three-phase invertor.

Returning now to the rotating "spoke" discharge principle of operation, that is to say with a non-alternating magnetic field, FIG. 5 is a circuit diagram of a three-phase invertor built and wired according to the present invention. In the case of FIG. 5, the electrode system comprises a central electrode 26 and six substantially 60° annular sector electrodes 27, 28, 29, 30, 31 and 32. Central electrode 26 is connected to a terminal 33 whereas a second terminal 34 is connected to the six outer electrodes 27–32 through respective primary windings 35a, 35b, 35c, 35d, 35e and 35f of an output transformer generally indicated by the reference number 35. A direct current supply is arranged to be connected between terminals 33 and 34 to complete the input side of the invertor.

The secondary side of output transformer 35 is provided with 18 secondary windings arranged in three separate output circuits provided, respectively, with output terminals 36,37; 38,39; and 40,41. Each primary winding of transformer 35, for example, primary winding 35a, is associated with three of the secondary windings, one for each of the output circuits. It will also be noted that not all the secondary windings are wound in the same sense. Thus, first primary winding 35a has all three of its associatd secondary windings wound in the opposite sense whereas fourth primary winding 35d has all its three associated secondary windings wound in the same sense. The secondary windings associated with output circuits 36–37 and 38–39 are wound oppositely to their corresponding second primary winding 35b whereas the associated secondary of output circuit 40"41 is wound in the same sense as said primary. Exactly the opposite situation occurs with the secondary windings associated with primary winding 35e. The secondary windings of output circuits 38–39 and 40–41 associated with the primary winding 35c are wound in the same sense thereas whilst the secondary winding of output circuit 36–37 in the same group is wound in the opposite sense. Exactly the opposite conditions exist with respect to the sixth primary winding 35f.

The discharge between central electrode 26 and any one of the outer electrodes 27–32 may be initiated by momentarily placing a conducting material therebetween or by employing a discharge initiating arrangement, such as that shown in FIG. 1, the D.C. power source being connected between input terminals 33 and 34. The existence of a non-alternating magnetic field B in the gap between the electrodes, said magnetic field being produced by a solenoid such as that of FIG. 3, results as in the first embodiment, in the rotation of a spoke discharge successively between electrodes 26 and 27, 26 and 28 . . . 26 and 32. During the time that the spoke passes outer electrode 27 current will pass through primary winding 35a. Immediately thereafter when the spoke is between electrode 26 and 28 a similar current will flow through primary winding 35b and so on until the spoke completes the circle with current passing through the last primary 35f. FIG. 6 illustrates, with respect to time, the corresponding primary currents Ia–If. As FIG. 6 clearly shows, during one-sixth of each rotational period of the spoke, current will pass periodically through each individual primary winding.

FIG. 7 shows the output voltages V 36,37, V 38,39 and V 40,41 which appear between the respective three pairs of output terminals. The changing currents in the primary windings 35a–35f induce voltages not only in their corresponding secondaries but also, to a lesser degree, in the remaining ones, said voltages being summed in the individual output circuits between said terminals so as to provide the three alternating voltage wave forms shown in FIG. 7. It will be seen that these wave forms are separated by 60° phase shifts and consequently the three outputs of the invertor of FIG. 5 represent a three-phase power source. A standard star connected three-phase source can be obtained by connecting together terminals 36, 39 and 40 as a common ground. This ground and the three remaining output terminals 37, 38 and 41 can then be connected to a three-phase load device such as a three-phase electric motor. Should a standard Delta connected three-phase source be desired, it would merely be necessary to provide three output terminals comprising commonly connected terminals 36 and 38, commonly connected terminals 39 and 41 and commonly connected terminals 37 and 40.

Obviously the frequency of the output is equal to the rotation of the discharge spoke. This depends upon the current drawn and the value of the magnetic field. Clearly the current drawn in its turn will depend both upon the electrode materials and the discharge medium but these are naturally fixed for any given invertor. The frequency of the output of the invertor can therefore be controlled by varying the value of magnetic field B.

Figure 8A:
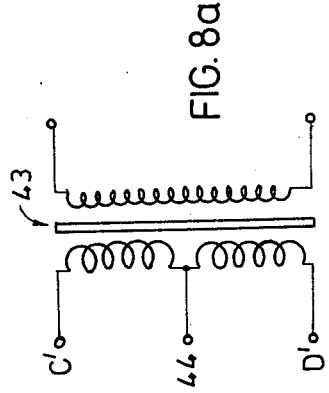
FIG. 8A shows an output transformer of the FIG. 8 arrangement for normal use as a high frequency invertor.
Figure 8B:
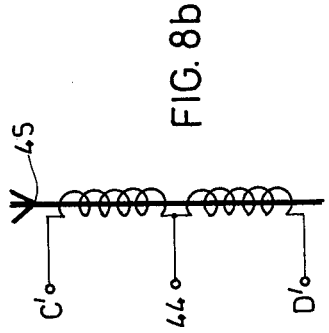
FIG. 8B shows an output for the FIG. 8 arrangement for use as a transmitter.
Figure 8:
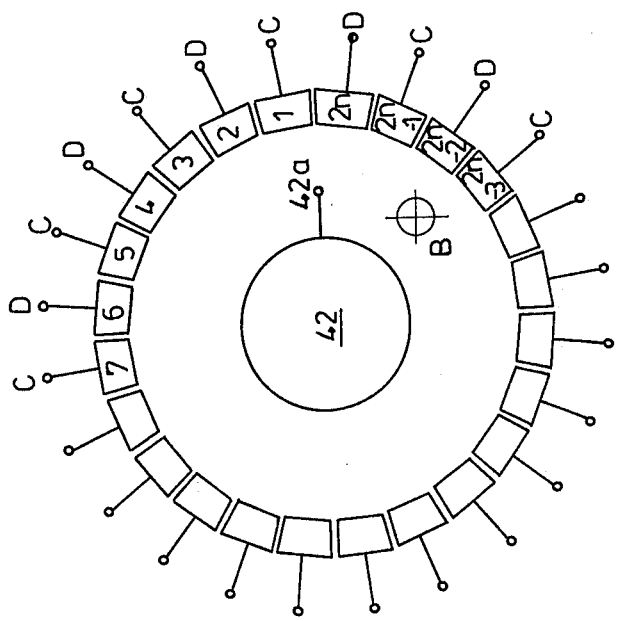
FIG. 8 shows a further embodiment of the present invention in a form suitable for use in a high frequency invertor.

A final embodiment of the invention is shown in FIG. 8 which is a diagrammatic illustration of the electrode system of a high frequency invertor or transmitter using the rotating spoke principle. FIGS. 8a and 8b merely show the output sides for use of the FIG. 8 arrangement in an invertor and a transmitter, respectively.

The electrode system shown in FIG. 8 comprises a cylindrical central electrode 42 and an even number of 2n outer electrodes (twenty-four in this case), each such electrode submitting an angle of slightly less than 360/2n° (approximately 7.5° in this case) at the center of cylindrical electrode 42. Cylindrical electrode 42 has a terminal 42a whereas alternate outer electrodes 1, 3, 5 . . . (2n−1) have commonly connected terminals C, and the remaining outer electrodes 2, 4, 6 . . . 2n have commonly connected terminals D. This electrode arrangement is associated with one of the two outputs of FIGS. 8a and 8b. FIG. 8a, similar to the FIG. 1 arrangement, comprises an output transformer 43, the primary of which has terminals C' and D' for direct connection with terminals C and D respectively, and a center tap terminal 44. A D.C. power supply may be connected between terminals 42a and 44 as may also a solenoid as shown in FIG. 1. On connecting the power source, a unidirectional magnetic field B is induced in the annular air gap between central electrode 42 and the 2n outer electrodes. On the initiation of an electric discharge between electrode 42 and one of these outer electrodes, a spoke is formed and rotates as in the FIG. 1 and 5 arrangements. The frequency appearing at the output of the secondary of transformer 43 will be n times the frequency of rotation of the discharge spoke, that is to say a frequency which will depend upon the current creating the magnetic field and flowing in the discharge. The inclusion of a variable resistor in the D.C. power supply circuit between terminals 42a and 44 will thus permit the frequency to be varied at will at the output of transformer 43.

FIG. 8B shows a slightly different arrangement in which the FIG. 8 invertor is used as a transmitter by connecting it to an antenna 45. Simple consideration of FIG. 8B will show that the antenna is merely wound with a center tapped winding to all intents and purposes similar to the primary of output transformer 43 of FIG. 8A.

Figure 9:
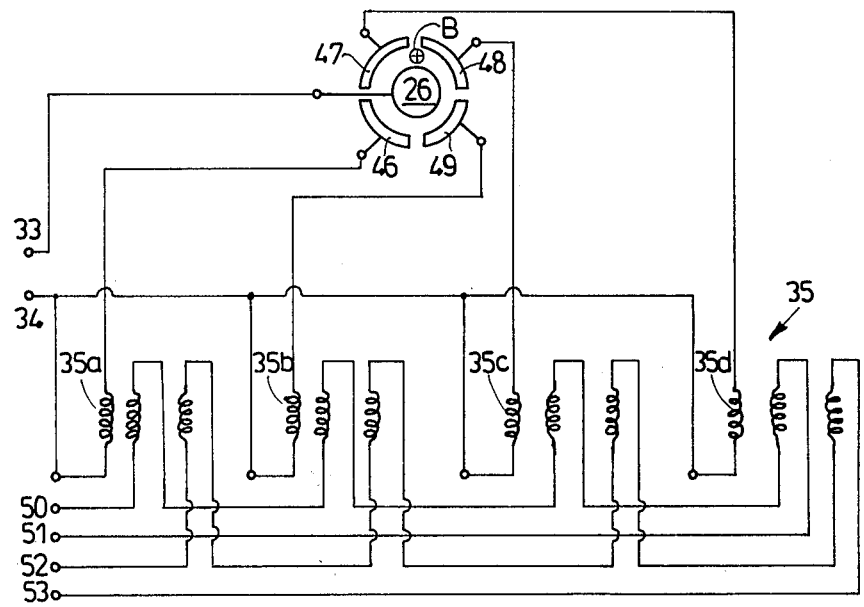
FIGS. 9 and 9A show a two-phase invertor built according to the present invention and a graph showing the output voltages produced.

Referring now to FIG. 9 of the drawings, a two-phase invertor is shown to be generally similar to the three-phase invertor of FIG. 5. Thus the two-phase invertor of FIG. 9 has a central electrode 26 and four outer electrodes 46, 47, 48 and 49, central electrode 26 being connected to input terminal 33 and outer electrodes 46-49 being connected to the other input terminal 34 through respective primary windings 35a, 35b, 35c and 35d of an output transformer 35. As in the FIG. 5 arrangement, a direct current supply can be connected between terminals 33 and 34 to complete the input side of the invertor and a solenoid or the like may be used to create a unidirectional magnetic field B in the annular gap between the central and outer electrodes.

The secondary side of output transformer 35 is provided with eight secondary windings in two separate output circuits provided, respectively, with output terminals 50,51 and 52,53. Each primary winding of transformer 35, for example, primary winding 35a, is associated with two of the secondary windings, one in each of the output circuits. As in FIG. 5, not all of the secondary windings are wound in the same sense. Primary winding 35a and its associated secondary winding in the output circuit between terminals 50,51 are wound in the same sense whereas the associated secondary in the other output circuit is wound in the opposite sense. In the case of primary winding 35b both of its associated secondaries are wound in the same sense whereas both secondaries associated with primary 35d are wound in the opposite sense thereto. Primary winding 35e is wound in the same sense as the associated secondary winding in the output circuit between terminals 52 and 53, the other secondary winding associated therewith being wound in the opposite sense.

Figure 9A:
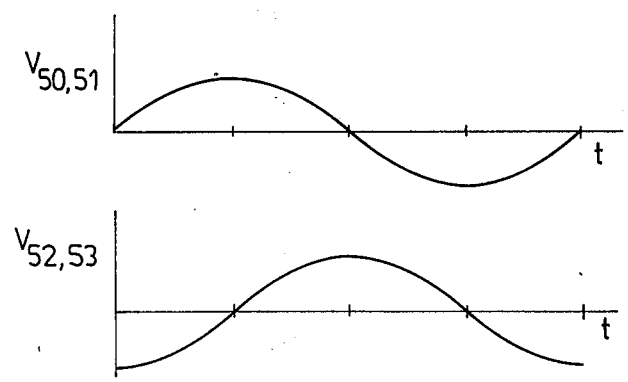

FIG. 9A shows the output voltages in said circuits 50,51 and 52,53. The operation of the two-phase invertor of FIG. 9 is obviously identical to that of the three-phase invertor of FIG. 5 except that there are four instead of six outer electrodes with a consequent reduction in the number of windings in the output transformer.

It will be understood that all of the embodiments mentioned herein have been described as if the electrode systems were open to the atmosphere. This is indeed possible and the electrodes of the prototype invertor of FIG. 1 were in face exposed. However, it will be understood that the electrode arrangement could perfectly well, and sometimes preferably, be mounted within a vacuum tube or even a pressurized casing. The discharge could then be made to take place in the presence of any desired gas, gases or vapor at a chosen pressure depending on the desired operating characteristics of the device.

FIG. 1 shows the magnetic field producing solenoid 50 as being connected in series with the D.C. supply feeding the discharge. However, it will readily be appreciated that the magnetic field in any of the embodiments described herein may be produced by a solenoid connected across a further D.C. power supply or, indeed, across the same supply as the electrode arrangement but in parallel therewith. This would permit very positive control of the output frequency since the magnetic field could be altered at will substantially without modifying the discharge current.

The electrodes of the various arrangements may take another form and need not necessarily be made of mild steel as was mentioned with respect to the prototype invertor of FIGS. 1-3. For example, the central electrode may be a mercury electrode as in the case of mercury arc invertors. It will therefore be appreciated that the electrodes may in fact be solid, liquid or a combination of the two.

It is also clear that the constant or alternating magnetic field created in the gaps between the electrodes can be produced by any adequate means and not necessarily by a solenoid. For instance, a constant field could be produced by a permanent magnet or magnets, variation in the applied magnetic field then being accomplished by moving the magnets mechanically or by mechanically interposing a high permeability material.

An invertor constructed in accordance with the present invention and denominated by the invertors as a "magnetoplasmadynamic" invertor shows many advantages over conventional inversion methods particularly for installations having intermediate or high power requirements. These advantages include higher maximum voltages possible per invertor unit, the absence of commutating capacitors as opposed to normal transistor circuits which are very sensitive to transients and the general economy, simplicity and robustness of design which result in lower costs and an easily variable output frequency.

A further modification of the present invention would be the application of a device such as shown in FIG. 9, for example, directly to a two-phase A.C. motor. In such a case the output transformer 35 of the FIG. 9 arrangement could be completely eliminated and the two phase-terminals of the motor would be connected, respectively, to commonly connected outer electrodes 46 and 48 and commonly connected outer electrodes 47 and 49. The third common terminal of the motor windings would be connected to one of the D.C. supply terminals 34 and the other D.C. terminal 33 would be connected directly to central electrode 26.

It will thus be readily apparent to those versed in the art that the specific description contained herein refers to preferred embodiments of the invention which may be altered in the above and many other ways without departing from the true scope of the invention which should be construed in accordance with the accompanying claims.

We claim:

1. Electrical apparatus comprising in combination:
   a first central electrode;
   an even number of generally annular sector electrodes disposed coaxially around said first electrode and separated therefrom by a substantially constant continuous discharge gap said sector electrodes being spaced from each other by a gap substantially smaller than said discharge gap;
   said first electrode having a first terminal for connection to one side of a D.C. power supply;
   a second terminal for connection to the other side of said D.C. power supply and connected in parallel to each of said sector electrodes through respective inductive impedances;
   magnetic field producing means adapted to establish a unidirectional magnetic field within said discharge gap, non-parallel to any electric discharge between said first electrode and any one of said sector electrodes so as to shift successively and continuously said discharge from one sector electrode to the next about said first electrode; and
   inductive output means associated with said inductive impedances for producing an output.

2. Invertor apparatus according to claim 1 in which said magnetic field producing means comprises a solenoid adapted for connection to a D.C. power supply to create said unidirectional magnetic field in said gap.

3. Invertor apparatus according to claim 1 in which said second electrodes comprise two substantially 180° generally annular sector electrodes and said inductive impedances comprise a center tapped primary winding, said center tap being connected to said second terminal and the ends of said primary winding being connected to said two sector electrodes, and said output means comprises a secondary winding having output terminals of said apparatus and defining with said primary winding an output transformer.

4. Invertor apparatus according to claim 3 in which said magnetic field producing means comprises a solenoid connected between said first central electrode and said first terminal.

5. Invertor apparatus according to claim 4 including a D.C. power supply and a variable resistor in series therewith connected between said first and second terminals.

6. Invertor apparatus according to claim 1 in which said second electrodes comprise an annular array of six annular sector electrodes disposed around said central electrode, said discharge gaps being a continuous annular gap between said central electrode and said annular array.

7. Invertor apparatus according to claim 6 in which said inductive impedances comprise six identically wound primary windings each having a first end connected to a respective one of said six sector electrodes and a second end connected to said second terminal, and said output means comprise with said primary windings an output transformer having a plurality of secondary windings associated with said primary windings to provide a three-phase output.

8. Invertor apparatus according to claim 7 in which said secondary windings comprise three independent groups of six secondary windings, the windings of each said group being connected in series between a corresponding pair of output terminals to define three output circuits, one for each phase, each of said six secondary windings of a given one of said groups being wound in association with a different one of said six primary windings.

9. Invertor apparatus according to claim 8 in which
(a) the first secondary windings of all three of said groups are wound in the opposite sense to their associated first primary winding;
(b) the second secondary windings of a first and second of said three groups are wound in the opposite sense to that of their associated primary winding, and the second secondary winding of the third of said three groups is wound in the same sense as said associated second primary winding;
(c) the third secondary winding of said first of said three groups is wound in the opposite sense as its associated third primary winding and the third secondary windings of said second and third of said groups are wound in the same sense as said associated third primary winding;
(d) the fourth secondary windings of each of said three groups are wound in the same sense as their associated fourth primary winding;
(e) the fifth secondary windings of said first and second of said groups are wound in the same sense as their associated fifth primary windings, and the fifth secondary winding of said third group is wound in the opposite sense to that of said fifth primary winding; and
(f) the sixth secondary winding of said first of said groups is wound in the same sense as its associated sixth primary winding and the sixth secondary windings of said second and said third of said groups are wound in the opposite sense to that of said sixth primary winding.

10. Invertor apparatus according to claim 1 in which alternate ones of said outer electrodes are connected together to define two groups of commonly connected to electrodes, and said inductive impedances comprise a center tapped primary winding, said center tap being connected to said second terminal and the two ends of said primary winding are connected to said two groups of electrodes.

11. Invertor apparatus according to claim 10 in which said output means comprise an antenna around which said primary winding is wound.

12. Invertor apparatus according to claim 10 in which said output means together with said primary winding define an output transformer.

13. Invertor apparatus according to claim 11 or 12 in which said magnetic field producing means comprise a solenoid disposed substantially coaxially with said central electrode and said annular array of outer electrodes.

14. Invertor apparatus according to claim 1 in which said second electrodes comprise an annular array of four annular sector electrodes disposed around said central electrode, said discharge gaps being a continuous annular gap between said central electrode and said annular array.

15. Invertor apparatus according to claim 14 in which said inductive impedances comprise four identically wound primary windings each having a first end connected to a respective one of said four sector electrodes and a second end connected to said second terminal and said output means comprise, with said primary windings, an output transformer having a plurality of secondary windings associated with said primary windings to provide a two-phase output.

16. Invertor apparatus according to claim 15 in which said secondary windings comprise two independent groups of four secondary windings, the windings of each said group being connected in series between a corresponding pair of output terminals to define two output circuits, one for each phase, each of said four secondary windings of a given one of said two groups being wound in association with a different one of said four primary windings.

17. Invertor apparatus according to claim 16 in which:
(a) the first secondary winding of the first of said two groups is wound in the same sense as its corresponding first primary winding whereas said first secondary winding of the second of said groups is wound in the opposite sense;
(b) the second secondary windings of said two groups are wound in the same sense as their associated second primary winding;
(c) the third secondary winding of the first of said groups is wound in the opposite sense to its associated third primary winding whereas the third secondary winding of the second of said groups is wound in the same sense as said associated third primary winding; and
(d) the fourth secondary windings of both of said groups are wound in the opposite sense to their associated fourth primary winding.

18. Invertor apparatus according to claim 14 including a discharge initiation electrode projecting into said discharge gap and a pulse generator connected to said initiation electrode to produce thereon a voltage pulse with respect to said central electrode.

19. Invertor apparatus comprising, in combination:
a solenoid wound on a substantially spool shaped core having end flanges;
a D.C. supply connected to said solenoid; an electrically insulating disc mounted on one of said end flanges;
a generally cylindrical central electrode mounted on said disc, substantially coaxial with said solenoid;
two substantially 180° annular sector outer electrodes mounted on said disc around said central electrode to define a substantially continuous annular electric discharge gap between said central electrode and said outer electrodes;
an output transformer provided with a primary winding having its ends connected to respective ones of said two outer electrodes and a secondary winding having a pair of output terminals of said apparatus, said primary winding having a center tap; and
a D.C. power supply connected between said center tap and said central electrode.

20. Invertor apparatus according to claim 19 in which said solenoid is connected in series with said first electrode whereby a single D.C. power supply provides power both for said solenoid and said electrode arrangement.

21. A high frequency invertor apparatus comprising, in combination:
a generally cylindrical central electrode;
an even numbered multiplicity of substantially identical outer electrodes disposed in a generally annular array around said central electrode and defining a substantially continuous annular discharge gap with respect thereto, alternate ones of said outer electrodes being connected together to define first and second groups of commonly connected outer electrodes;
an output device including an input inductance in the form of a winding having first and second ends respectively connected to said first and second groups of electrodes and a center tap for connection through a D.C. power supply to said central electrode; and
magnetic field producing means adapted to produce a unidirectional magnetic field in said discharge gap, substantially at right angles thereto.

22. A high frequency invertor according to claim 21 in which said output device comprises an antenna on which is wound said winding.

23. A high frequency invertor according to claim 21 in which said output device consists of an output transformer of which said winding is a primary winding, said transformer having a secondary output winding.

24. A two-phase invertor comprising, in combination:
a circular central electrode connected to a first D.C. input terminal;
first, second, third and fourth annular sector outer electrodes disposed in an annular array around said central electrode and defining therewith a substantially continuous annular discharge gap;
magnetic field producing means adapted to produce a unidirectional magnetic field in said discharge gap substantially at right angles thereto; and
an output transformer comprising first, second, third and fourth identically wound primary windings having first ends connected in common to a second D.C. input terminal and second ends connected to correspondingly numbered ones of said four outer electrodes, and first and second independent groups of first, second, third and fourth series connected secondary windings associated respectively with correspondingly numbered ones of said four primary windings, such that:
(a) said first secondary winding of said first group is wound in the same sense as said first primary winding whereas said first secondary winding of said second group is wound in the opposite sense;
(b) said second secondary winding of both of said groups are wound in the same sense as said second primary winding;
(c) said third secondary winding of said first group is wound in the oppposite sense to that of said third primary winding whereas said third secondary winding of said second group is wound in the same sense as said third primary winding; and
(d) both of said fourth secondary windings of said first and second groups are wound in the opposite sense to that of their associated fourth primary winding.

25. A three-phase invertor comprising, in combination:
a circular central electrode connected to a first D.C. input terminal;
first, second, third, fourth, fifth and sixth annular sector outer electrodes disposed in an annular array around said central electrode and defining therewith a substantially continuous annular discharge gap;
magnetic field producing means adapted to produce a unidirectional magnetic field in said discharge gap, substantially at right angles thereto; and
an output transformer comprising first, second, third, fourth, fifth and sixth identically wound primary windings having first ends connected in common and second ends connected to correspondingly numbered ones of said six outer electrodes, and first, second and third independent groups of first, second, third, fourth, fifth and sixth series connected secondary windings associated respectively with correspondingly numbered ones of said six primary windings, such that:
(a) said first secondary winding of each of said first, second and third groups is wound in the opposite sense to said first primary winding;
(b) said second secondary windings of said first and second groups is wound in the opposite sense to said second primary winding whereas said second secondary winding of said third group is wound in the same sense as said second primary winding;
(c) said third secondary winding of said first group is wound in the opposite sense to that of said third primary winding whereas said third secondary winding of said second and third groups are wound in the same sense as said third primary winding;
(d) said fourth secondary windings or each of said first, second and third groups are all wound in the same sense as said fourth primary winding;

(e) said fifth secondary windings of said first and second groups are wound in the same sense as said fifth primary winding whereas said fifth secondary winding of said third group is wound in the opposite sense of said fifth primary winding;

(f) said sixth secondary winding of said first group is wound in the same sense as said sixth primary winding whereas said sixth secondary windings of said second and third groups are wound in the opposite sense to that of said sixth primary winding.

* * * * *